United States Patent [19]

Bronstert et al.

[11] Patent Number: 4,839,434

[45] Date of Patent: Jun. 13, 1989

[54] PREPARATION OF HOMO- AND COPOLYMERS HAVING TERMINAL MERCAPTO GROUPS AND THEIR USE

[75] Inventors: Klaus Bronstert, Carlsberg; Hans-Michael Walter, Ruppertsberg; Hans-Dieter Schwaben, Freisbach, all of Fed. Rep. of Germany

[73] Assignee: BASF Aktiengesellschaft, Ludwigshafen, Fed. Rep. of Germany

[21] Appl. No.: 205,178

[22] Filed: Jun. 10, 1988

[30] Foreign Application Priority Data

Jun. 19, 1987 [DE] Fed. Rep. of Germany ....... 3720322

[51] Int. Cl.$^4$ .............................................. C08F 8/34
[52] U.S. Cl. ................................ 525/350; 525/333.1; 525/333.5
[58] Field of Search ................... 525/350, 333.5, 333.1

[56] References Cited

U.S. PATENT DOCUMENTS 4,169,115  9/1979  Tung et al. ........................... 525/314
4,722,976  2/1988  Ceska .................................. 525/301

Primary Examiner—Christopher Henderson
Attorney, Agent, or Firm—Oblon, Spivak, McClelland, Maier, & Neustadt

[57] ABSTRACT

Homo- or copolymers which have terminal mercapto groups, are composed of one or more monomers from the group consisting of butadiene, isoprene and styrene and are obtained by anionic polymerization of one or more of the stated monomers in the presence of one or more organolithium compounds followed by reaction (of the living anions) with an episulfide of the general formula I

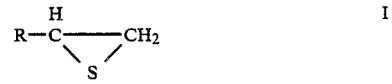

where R is hydrogen, alkyl of 1 to 18 carbon atoms or aryl of 6 to 10 carbon atoms, with the formation of one or more primary or secondary mercapto groups at the end of the polymer chain(s) are prepared by a process in which a thiolcarboxylic acid of the general formula II

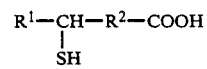

where $R^1$ is hydrogen, alkyl of 1 to 10 carbon atoms or —CH$_2$—COOH and $R^2$ is 0 or from 1 to 10 CH$_2$ units, is added directly to the resulting reaction mixture in an amount of from 0.5 to 2 moles of the thiolcarboxylic acid per mole of episulfide, and the reaction product is subjected to an aftertreatment 3 Claims, No Drawings

PREPARATION OF HOMO- AND COPOLYMERS HAVING TERMINAL MERCAPTO GROUPS AND THEIR USE

The invention relates to a process for the preparation of homo- or copolymers which have terminal mercapto groups, are composed of one or more monomers from the group consisting of butadiene, isoprene and styrene and are obtained by anionic polymerization of one or more of the stated monomers in the presence of one or more organolithium compounds followed by reaction (of the living anions) with an episulfide of the general formula I

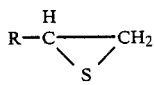

where R is hydrogen, alkyl of 1 to 18 carbon atoms or aryl of 6 to 10 carbon atoms, with the formation of one or more primary or secondary mercapto groups at the end of the polymer chain(s).

The relevant prior art includes:
(1) U.S. Pat. No. 4,169,115
(2) U.S. application Ser. No. 07/030,482
(3) U.S. application Ser. No. 07/030,483

(1) describes a process for the preparation of polymers having terminal primary or secondary mercapto groups and the use of these polymers for the preparation of block copolymers from a block which has been initiated anionically and subjected to free radical polymerization.

Furthermore, (2) describes a continuous process, and (3) a batchwise process, for the preparation of high-impact, translucent polystyrene based on rubbers which possess terminal mercapto groups and have been subjected to anionic polymerization.

In the preparation of polymers having terminal mercapto groups by polymerization of anionically polymerizable monomers with, for example, butyllithium as an initiator and subsequent reaction of the reactive chain end with an episulfide, for example by the process described in (1), a side reaction in the form of coupling of polymer chains (of the original molecular weight prior to reaction with the episulfide) to give higher polymers having two or more times the molecular weight is generally observed and takes place to a considerable extent. In the further conversion of the polymers having terminal mercapto groups to give block copolymers or high-impact, translucent polystyrene or polyalkylstyrene, these coupled byproducts are inactive and reduce the yield of block copolymer and result in poorer translucence.

It is therefore an object of the present invention to improve the process described in (1) for the preparation of polymers having terminal mercapto groups in such a way that the coupling reaction is suppressed.

We have found that this object is achieved by a process as claimed in claim 1.

The present invention therefore relates to a process for the preparation of homo- or copolymers which have terminal mercapto groups, are composed of one or more monomers from the group consisting of butadiene, isoprene and styrene and are obtained by anionic polymerization of one or more of the stated monomers in the presence of one or more organolithium compounds followed by reaction (of the living anions) with an episulfide of the general formula I

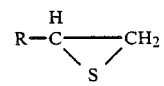

where R is hydrogen, alkyl of 1 to 18 carbon atoms or aryl of 6 to 10 carbon atoms, with formation of one or more primary or secondary mercapto groups at the end of the polymer chain(s).

In this process, a thiolcarboxylic acid of the general formula II

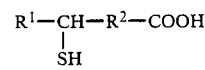

where $R^1$ is hydrogen, alkyl of 1 to 10 carbon atoms or $-CH_2-COOH$ and $R^2$ is 0 or from 1 to 10 $CH_2$ units, is added directly to the resulting reaction mixture in an amount of from 0.5 to 2 mols of the thiolcarboxylic acid per mol of episulfide, and the reaction product is subjected to an aftertreatment.

The present invention furthermore relates to the use of the polymers having terminal mercapto groups, and prepared by the novel process, for the preparation of block copolymers from a block which has been anionically initiated and subjected to free radical polymerization, and for the preparation of translucent polystyrene and/or polyalkylstyrene which have been toughened with rubber.

On the one hand, the novel process permits the preparation of homo- and copolymers which have terminal mercapto groups, have been produced by anionic polymerization and contain a lower level of coupled products. On the other hand, the use of the said polymers permits the preparation of block copolymers in higher yield and the preparation of high-impact, translucent polystyrene having higher translucence.

The process according to the invention is described in detail below.

The novel process is carried out very similarly to the process disclosed in (1) for the preparation of polymers having terminal mercapto groups. In this process, one or more monomers (eg. butadiene, isoprene, styrene or a mixture of these) which can be polymerized anionically with organolithium compounds, in particular with butyllithium, in a non-polar, aromatic or aliphatic hydrocarbon solvent, for example from the group consisting of benzene, toluene, ethylbenzene, cyclohexane and cycloheptane, or a mixture of these, are first polymerized to give polymer chains having a reactive chain end, the procedure being carried out in a manner which in principle is familiar to the skilled worker.

The mean molecular weight (GPC mean) of the polymers should be from 20,000 to 500,000, preferably from 30,000 to 200,000.

When the polymerization is complete, the reactive chain end (living anion) of the polymer chains is reacted with not less than one mol of a thiirane derivative, preferably ethylene sulfide or propylene sulfide, per mol of initiator, a $-CH_2-CH_2-SLi$ or $-CH_2-CH(CH_3)-SLi$ terminal group being incorporated in the molecule. The thiirane is of the general formula I where R is hydrogen, alkyl of 1

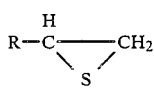

to 18 carbon atoms or aryl of 6 to 10 carbon atoms.

The reaction is accompanied by an undesirable side reaction in the form of coupling of polymer chains to give polymer molecules having two or more times the initial molecular weight. Although the coupling products contain the same amount of sulfur as the uncoupled molecules, they do not possess the activity attributable to the mercapto groups and typical and essential for further reaction to give block copolymers or highimpact, translucent polystyrene or polyalkylstyrene. In particular, in free radical polymerization, they are not capable of forming block copolymers. Furthermore, they considerably increase the solution viscosity and therefore make mixing and production of the desired morphology more difficult during use in a downstream polymerization.

Although the coupling reaction can be influenced to a slight extent within narrow reaction conditions (temperature and time), it cannot be suppressed to any significant extent. The reaction with the episulfide is most advantageously carried out at from 25 to 50° C. for a reaction time of from 20 to 120 minutes. Lower temperatures and shorter times are less advantageous with regard to conversion of the episulfide, while higher temperatures and longer times have disadvantages due to an increase in other side reactions.

We have found, surprisingly, that the coupling reaction can be substantially suppressed and hence generally better activity of the polymers having terminal mercapto groups can be achieved if a thiolcarboxylic acid of the formula II

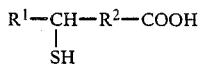

is added to the reaction mixture directly after reaction of the reactive chain ends of the anionically initiated polymers with the episulfide. In the formula, $R^1$ is hydrogen, alkyl of 1 to 18 carbon atoms or $-CH_2-COOH$ and $R^2$ is 0 or from 1 to 10 $CH_2$ groups.

Thioglycolic acid, thiolactic acid and thiomalic acid are particularly preferred.

The thiolcarboxylic acid should be added to the reaction mixture at from 20° to 50° C., preferably from 30° to 45° C., and a subsequent reaction time of from 5 to 120, preferably from 15 to 80, minutes should be maintained, with gentle stirring. The amount of the thiolcarboxylic acid is chosen so that there are from 0.5 to 2 moles of thiolcarboxylic acid per mole of episulfide used, an equimolar ratio being preferred. Larger amounts have no additional effect. The addition may be made all at once or a little at a time. The thiolcarboxylic acid can be introduced in pure form or diluted with a suitable solvent (eg. toluene).

In comparison with the thiolcarboxylic acids, carboxylic acids (eg. glacial acetic acid) or other acids have little effect.

Effective amounts of further additives, such as antioxidants, may be added to the reaction mixture.

The polymer can be worked up, for example, by coagulation in a nonsolvent, such as methanol, with subsequent drying of the precipitated material, or by evaporation of the process solvent, if this is required to allow the product to be used.

The novel process permits the preparation of homo- or copolymers, and the monomers can be arranged in the copolymers in the form of blocks or randomly. Examples of block copolymers are those which have a tapered transition and are formed by simultaneous polymerization of monomer mixtures (eg. styrene/butadiene).

Depending on the type and amount of the monomers used, thermoplastics, thermoplastic elastomers or rubbers can be prepared.

These products can be processed in a conventional manner, for example by casting of solutions, presing, injection molding, extrusion, melt-spinning and similar methods, a large number of useful products being formed, for example fibers, films, compression moldings and injection moldings. The resulting block copolymers can also be compounded in a conventional manner, for example with pigments, fillers, stabilizers, flameproofing agents and dyes.

Direct free radical (peroxide-initiated) polymerization of the reaction mixture for the preparation of graft copolymers according to (1) and the preparation of highimpact and translucent polystyrene or polyalkylstyrene according to (2) or (3) is particularly preferred.

A larger number of analytical methods, which are known in principle, are suitable for the characterization of the polymers obtained by the novel process.

The properties stated in the Examples and Comparative Experiments and obtained from samples are measured as follows:

1. Determination of the sulfur content, S, in %, by elemental analysis.
2. Determination of the molecular weight, M, in g/mol, by gel permeation chromatography.
3. The content of coupled byproducts, K, in % by area, based on the total area, by gel permeation chromatography (GPC).
4. Determination of the viscosity number, VZ, in ml/g at 23° C. in toluene by a method similar to that described in DIN 53,726.
5. The yield stress, ST, in $N/mm^2$, was determined according to DIN 53,544, on compression-molded dumbbells.
6. The notched impact strength, aKL, in $kJ/m^2$, was determined, according to DIN 53,753 on compression-molded standard small bars.
7. To evaluate the translucence, TL, of the products obtained by the novel process and used according to claim 5, a scale was first set up. This scale comprises the ratings 1 to 9 in Table 1 below, the lowest rating representing good translucence. In order to define the ratings stated in Table 1, a commercial high-impact polystyrene (polystyrene KR 2791 from BASF Aktiengesellschaft) which possessed capsular particle morphology and had the rating 4 was used as a basis. Blends of this product, in the weight ratios stated in Table 1, with commodity polystyrene having a viscosity number of 96 ml/g gave the values 3-1 for the translucence. Blends having higher translucence, ie. the values 5-9 in the table, were obtained by blending with a highimpact commercial polystyrene having cellular particle morphology (polystyrene 476 L from BASF Aktiengesellschaft). The measurement was carried out by visual comparison of 2 mm thick compression-molded panels of sample material with similar panels of the stated calibration substance.

TABLE 1

| Ratings for translucence | Parts by weight in mixture | | |
|---|---|---|---|
| | Product A | Commodity polystyrene | Product B |
| 1 | 20 | 80 | 0 |
| 2 | 40 | 60 | 0 |
| 3 | 60 | 40 | 0 |
| 4 | 100 | 0 | 0 |
| 5 | 06 | 0 | 4 |
| 6 | 92 | 0 | 8 |
| 7 | 88 | 0 | 12 |
| 8 | 84 | 0 | 16 |
| 9 | 80 | 0 | 20 |

The Examples which follow illustrate the invention without restricting it. Parts and percentages are by weight.

EXAMPLE 1

3500 ml of cyclohexane were initially taken under nitrogen in a stirred apparatus and, with the addition of a few drops of styrene, were titrated with sec-butyllithium at 40° C. until the color changed from colorless to pale yellow, this procedure being carried out to remove impurities. Thereafter, 5.3 ml of 1.45 N sec-butyllithium solution (7.7 millimoles) were added with a glass syringe and the mixture was heated to 70° C. 654 g (1,006 ml) of butadiene were added dropwise in the course of 50 minutes at a rate such that the temperature of the mixture was always kept at from 67° to 72° C. Stirring was then continued for a further 70 minutes at 70° C., after which sample 1A was removed.

After the reaction mixture had cooled to 40° C., 0.46 g of freshly distilled ethylene sulfide (7.7 millimoles) was added, stirring was continued for 1 hour at 40° C. and sample 1B was then taken.

The mixture was then divided into two equal parts, and 0.71 g of thioglycolic acid (7.7 millimoles) was added to one half at 40° C. After stirring had been carried out for 1 hour at 40° C., sample 1C was taken. Instead of thioglycolic acid, 0.46 g of glacial acetic acid (7.7 millimoles) was added to the second half, which was further treated in the same manner. Sample 1D was taken from this mixture and was worked up, in the same manner as the other samples, 1A, 1B and 1C, by evaporating the solvent.

The results of the measurements on the samples are summarized in Table 2 (K=coupling, VZ=viscosity number).

TABLE 2

| Name of sample | $\overline{M}$* g/mol | K % | VZ ml/g | [S] % |
|---|---|---|---|---|
| 1A | 85,000 | 2 | 130 | 0.001 |
| 1B | — | 41 | 198 | 0.048 |
| 1C | — | 15 | 135 | 0.048 |
| 1D | — | 33 | — | 0.049 |

*Polybutadiene samples having a narrow distribution were used as the calibration standard

EXAMPLE 2

The polymerization and the reaction with ethylene sulfide were carried out essentially as described in Example 1. However, instead of 654 g (1,006 ml) of butadiene, 500 g (770 ml) of butadiene were used. To suppress the coupling, 0.71 g of thioglycolic acid (sample 2A), 0.82 g of thiolactic acid (sample 2B) and 1.16 g of thiomalic acid (sample 2C) were each added to one third of the mixture under conditions similar to those stated in Example 1. The polymers were stabilized by adding 0.5% of ®Kerobit TBK (a sterically hindered, phenolic antioxidant from BASF AG).

The results of characterization of the samples are summarized in Table 3.

TABLE 3

| | K % | VZ ml/g | [S] % |
|---|---|---|---|
| 1A | 22 | 120 | 0.048 |
| 2B | 24 | 127 | 0.048 |
| 2C | 20 | 123 | 0.048 |

EXAMPLE 3

The polymerization was carried out as described in Example 2. After the reaction mixture had cooled to 40° C., 0.57 g of freshly distilled propylene sulfide (7.7 millimoles) was added, stirring was carried out for 1 hour and sample 3A was then taken.

0.71 g of thioglycolic acid (7.7 millimoles) was then added to the mixture at 40° C. Following after-treatment for one hour at 40° C., sample 3B was taken and was worked up, like all samples of the preceding Examples, by evaporating the solvent.

The content of coupled material, K, was 33% in the case of sample 3A and 20% in the case of sample 3B.

EXAMPLE 4

The modified polybutadienes 1B and 1C were used for the preparation of high-impact, translucent polystyrenes.

For this purpose, 9 parts of polybutadiene were dissolved in 91 parts of styrene and this solution was then subjected to thermal polymerization in a kettle equipped with an anchor stirrer and having a capacity of 5 liters, at 123° C., in the presence of 0.05% of tert-dodecylmercaptan as a molecular weight regulator, while stirring for 200 minutes, until a conversion of 35% was reached. Polymerization was then continued in aqueous suspension. For this purpose, 0.1 part of dicumyl peroxide and, per kilogram of the resulting reaction mixture, 900 ml of water, 9.0 g of a suspending agent based on polyvinyl pyrrolidone and 1.8 g of sodium pyrophosphate were added. Polymerization was carried out in suspension with a level of 90%, a stirrer speed of 300 rpm under isothermal conditions for 5 hours at 130° C. and 5 hours at 140° C. to a conversion of more than 99%, based on the styrene. The polymerized beads of the product were filtered off, washed with water and dried at 60° C. and under 14 mmHg.

The products obtained are characterized in Table 4.

TABLE 4

| Polybutadiene used | 1B | 1C |
|---|---|---|
| VZ | 85.6 | 86.2 |
| ST | 36.3 | 35.8 |
| aKL | 5.5 | 6.3 |
| TL | 3.5 | 2.0 |

Note 1: The viscosity number (VZ) of the hard matrix in ml/g was determined at 23° C. according to DIN 53,724, in toluene.

The values in Table 4 clearly show that polybutadiene 1C leads to a product having improved translucence.

We claim:

1. A process for the preparation of a homo- or copolymer which has terminal mercapto groups, is composed of one or more monomers from the group consisting of butadiene, isoprene and styrene and is obtained by anionic polymerization of one or more of the stated monomers in the presence of one or more organolithium compounds followed by reaction of the living anions with an episulfide of the formula I

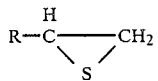   I where R is hydrogen, alkyl of 1 to 18 carbon atoms or aryl of 6 to 10 carbon atoms, with formation of one or more primary or secondary mercapto groups at the end of the polymer chain(s), wherein a thiolcarboxylic acid of the formula II

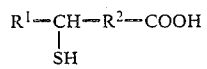

where $R^1$ is hydrogen, alkyl of 1 to 10 carbon atoms or $-CH_2-COOH$ and $R^2$ is 0 or from 1 to 10 $CH_2$ units, is added directly to the resulting reaction mixture in an amount of from 0.5 to 2 moles of the thiolcarboxylic acid per mole of episulfide, and the reaction product of the thiolcarboxylic acid and polymer derived from episulfide and polymer with living anions is subjected to an heat aftertreatment.

2. A process as claimed in claim 1, wherein about 1 mole of thiolcarboxylic acid is used per mole of episulfide.

3. A process as claimed in claim 1, wherein the aftertreatment is carried out at from 20° to 50° C. for from 5 to 180 minutes.

* * * * *